United States Patent [19]

Suda et al.

[11] Patent Number: 4,657,352

[45] Date of Patent: Apr. 14, 1987

[54] IMAGE OPTICAL SYSTEM INCLUDING A NON-SPHERICAL SINGLE LENS

[75] Inventors: Shigeyuki Suda, Tokyo; Masayuki Suzuki; Toshinori Ando, both of Yokohama, all of Japan

[73] Assignee: Canon Kabushiki Kaisha, Tokyo, Japan

[21] Appl. No.: 781,477

[22] Filed: Sep. 30, 1985

[30] Foreign Application Priority Data

Oct. 5, 1984 [JP] Japan ................. 59-209992

[51] Int. Cl.$^4$ .............................. G02B 13/08
[52] U.S. Cl. ................................... 350/432
[58] Field of Search ........................... 350/432

[56] References Cited

U.S. PATENT DOCUMENTS 934,579  9/1909  Straubel et al. ............... 350/432

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

The imaging optical system according to the present invention comprises a non-spherical single lens having a first surface of a non-spherical shape in which the radius of curvature becomes gradually greater away from the optic axis and a planar second surface, and a parallel flat plate disposed adjacent to the second surface of the non-spherical single lens as required. The imaging optical system satisfies the following conditions:

$$1.2 < q < 1.5$$
$$1.68 < n$$

$0 \leq t$ ($t = 0$ means the absence of the parallel flat plate.)

$$q = \frac{(d + t)(1 - NA^2)}{f \cdot (n - 1)^3}$$

where f is the focal length of the non-spherical single lens, d is the on-axis thickness of the single lens, n is the refractive index of the single lens, NA is the numerical aperture of the single lens, $r_1$ is the radius of curvature of the first surface of the single lens in the vicinity of the optic axis, and t is the thickness of the parallel flat plate.

6 Claims, 13 Drawing Figures

IMAGE OPTICAL SYSTEM INCLUDING A NON-SPHERICAL SINGLE LENS

BACKGROUND AND SUMMARY OF THE INVENTION

This invention relates to an imaging optical system such as an objective lens used in a video and audio disc, an optical memory device or the like and a collimator lens, and in particular to an imaging optical system in which the numerical aperture NA is up to the order of 0.55 and aberration correction in the vicinity of the axis has been done.

Some of objective lenses used in optical memory devices and the like comprise three to five spherical lens groups as proposed in Japanese Patent Pablication No. 44209/1977, Japanese Laid-open Patent Application No. 148143/1977, etc. It is desired from the viewpoints of not only imaging performance but also the capability of following the automatic focusing and tracking control at a high speed that objective lenses used for this usage be compact and light in weight, but said objective lenses comprising spherical lens groups are not sufficient in this point. Also, said objective lenses are combination lenses and therefore, in such objective lenses, adjustment of the optic axis and assembly adjustment of the lens spacing are the cause of their high cost. In order to solve such problems, the use of a non-spherical single lens as the objective lens for an optical memory device has heretofore been proposed in Japanese Laid-open Patent Application No. 64714/1982, Japanese Laid-open Patent Application No. 201210/1982, Japanese Laid-open Patent Application No. 17409/1983 and Japanese Laid-open Patent Application No. 68711/1983. However, all of these propositions are concerned with the type in which both surfaces are non-spherical or one surface is spherical and generally require the amount of allowable parallel eccentricity to be as high as the order of 1-2 $\mu$m. Accordingly, it has been difficult for the actually manufactured lens to obtain a sufficient performance as per the design value.

It is an object of the present invention to provide an imaging optical system which is easy to manufacture and which has a good imaging performance.

To achieve such object, the imaging optical system according to the present invention comprises a non-spherical single lens having a first surface of a non-spherical shape in which the radius of curvature becomes gradually greater away from the optical axis and a planar second surface, and a parallel flat plate disposed adjacent to the second surface of said non-spherical single lens as required. The above object is achieved by satisfying the following conditions:

$$1.2 < q < 1.5$$
$$1.68 < n$$
$$0 \leq t \ (t = 0 \text{ means the absence of the parallel flat plate.})$$

$$q = \frac{(d + t)(1 - NA^2)}{f \cdot (n - 1)^3}$$

where f is the focal length of the non-spherical single lens, d is the on-axis thickness of said single lens, n is the refractive index of said single lens, NA is the numerical aperture of said single lens, $r_1$ is the radius of curvature of the first surface of said single lens in the vicinity of the optic axis, and t is the thickness of said parallel flat plate.

The parallel flat plate disposed as required may be, for example, the substrate glass of a recording medium used in a device for an optical disc DAD or the like, or the right beam exit window of a semiconductor laser. That is, in the optical disc, the light beam condensed on the recording medium is applied through the substrate glass, and where the light beam from the semiconductor laser is to be collimated by a non-spherical single lens, the light beam passed through the exit window provided for the protection of the semiconductor laser is collimated by the lens. Accordingly, in such a state of use, the imaging optical system is an optical system including a parallel flat plate disposed in addition to a non-spherical single lens. Of course, in a different state of use, the non-spherical single lens may be used singly. In this case, the value of t in the aforemention condition is zero.

DESCRIPTION OF THE PREFERRED EMBODIMENTS

The imaging optical system according to the present invention is a lens in which the aberrations chiefly in the vicinity of the axis are corrected, and is particularly suitable as an objective lens for an optical memory disc (device) adapted to effect tracking by the lens itself being moved as described above and a collimator lens used in a similar device.

Specifically, it is a lens which has NA of the order of 0.55 from the relation such as recording density, reading performance and disc inclination, reads optically recorded information usually through a transparent substrate having a thickness of the order of 1.1–1.5 mm in order to alleviate the influence of flams, dust or the like on the surface of the disc and has an imaging performance approximate to the limit of the diffraction of the lens in the range of 0.1–0.2 mm$\phi$, and a lens which collimates a semiconductor laser light through a protective transparent substrate having a thickness of the order of 0.1–1.0 mm. The range of aberration correction of the lens used for these purposes may be the correction only at a point of the optic axis as a rule, but in order to permit the direction error of the incident light beam and the working and setting errors of the lens to a certain degree, the range of the order of 0.1–0.2 mm$\phi$ about the optic axis is appropriate. The focal length f is determined from NA usually after the beam diameter has been set to the range of 2–6 mm$\phi$ from the relations of the dimensional condition, the residual aberrations and the working distance of the lens.

It is to be understood that a semiconductor laser of a wavelength $\lambda$ of the order of 0.78–0.84 $\mu$m is used as a light source. In the following embodiments, when the focal length is f and the thickness of the lens is d and the radius of curvature of the first surface in the vicinity of the optic axis is $r_1$ and the refractive index of the lens is n and the thickness of the recording medium or the laser protecting transparent substrate is t and the working distance is W.D and the numerical aperture of the lens is NA and the wavelength of the light source is $\lambda$ and as regards the equation representing the shape of the lens surface, the radius of curvature at the point of intersection with the optic axis is $r_1$ and the x-axis is selected on the optic axis coincidently with the direction of travel of light and the y-axis is selected so that it is perpendicular to the x-axis and passes through the vertex of the lens surface, description will be made in detail as the amount of change $X_1$ (see FIG. 1) of the x-coordinates from the y-axis relative to the value $H_1$ of the y-coordinates being represented by $$X_1 = (H_1^2/r_1)/(1 + \sqrt{1 - (1 + K_1)(H_1/r_1)^2}) + B_1 H_1^4 + C_1 H_1^6 + D_1 H_1^8 + E_1 H_1^{10} + A_1'|H_1|^3 + B_1'|H_1|^5 + C_1'|H_1|^7 + D_1'|H_1|^9 \quad (1)$$

In the imaging optical system according to the present invention, in spite of using a non-spherical single lens of which one surface is planar and which is easy to manufacture, spherical aberration and coma are well corrected. Therefore, the non-spherical single lens used in the present invention is a non-spherical lens in which the shape of the first surface is of such a non-spherical shape in which the radius of curvature is gradually longer away from the optic axis and the second surface opposite to the first surface is of a planar shape, and where a parallel flat plate is to be disposed, it is disposed adjacent to said second surface. When the focal length of the non-spherical single lens is f and the on-axis thickness of the lens is d and the refractive index of the lens is n and the numerical aperture of the lens is NA and the radius of curvature of the first surface in the vicinity of the optic axis is $r_1$ and the thickness of the parallel flat plate is t, the non-spherical single lens satisfies the following conditions:

$$1.2 < q < 1.5 \quad (2)$$

$$1.68 < n \quad (3)$$

$$0 \leq t$$

where $$q = (d+t)(1-NA^2)/f \cdot (n-1)^3$$

To form the second surface by a planar surface, the radius of curvature $r_1$ in the vicinity of the optic axis is represented by $$r_1 = (n-1)/f$$

under the above-mentioned conditions. After the material of the lens, the focal length of the lens and the radius of curvature $r_1$ have been determined as previously described, spherical aberration and coma must be eliminated by the thickness of the lens, the protective parallel flat plate and the non-spherical shape. The derivation of an equation is omitted, but assuming that the non-spherical shape of the lens is represented by equation (1) to satisfy the sine condition generally with a view to eliminate coma, the localized radius of curvature of the lens surface is expressed as the negative function of $X_1$ and $H_1$. It is desirable that correspondingly to the NA of the lens, $H_1$ be set so that the amount of dissatisfaction of the sine condition is 0 usually at a point greater than 0.8 and less than 1.0 of the radius of the pupil. If the refractive index of the lens does not satisfy formula (3), the amount of dissatisfaction of the sine condition will be a great negative value and it will be difficult to provide 0 at any other point than the point of $H_1 = 0$ and also, power is obtained by the first surface and therefore; $r_1$ will become small and it will be impossible to provide a great aperture, and this is particularly unsuitable for an objective lens. Further, these will be promoted by the fact that the thickness condition shown in formula (2) becomes smaller than 1.2.

On the other hand, the thickness of the lens and the protective parallel flat plate do not affect the sine condition, but chiefly affect spherical aberration. The amount of spherical aberration sharply increases with an increase in NA and is primarily proportional to the thickness of the lens. However, the degree of dependency on the refractive index is usually small in the range of the optical material (having a refractive index of the order of 1.5 – 1.8). Standing on the above-mentioned condition, it is optimum to set the sum of the thickness of the lens and the thickness t of the parallel flat plate to formula (2). That is, if the lower limit of formula (2) is exceeded, the height $H_1$ for which the amount of dissatisfaction of the sine condition is 0 will become too low, and if the upper limit of formula (2) is exceeded, 0 cannot be provided in the pupil. Thus, in designing, the thickness of the lens and the thickness of the parallel flat plate may be set within this condition, whereafter the non-spherical surface shape may be determined so as to eliminate spherical aberration, whereby the can be obtained a non-spherical single lens of which one surface is planar. This non-spherical shape can be found by the numerical calculation using the technique for optimizing the 3.5-order aberration coefficient and the light ray aberration itself disclosed in *The Lens Designing Method* written by Matsui and published by Kyoritsu Publishing Co., Ltd.

Some embodiments of the lens of the present invention will be shown below.

Figure 1:
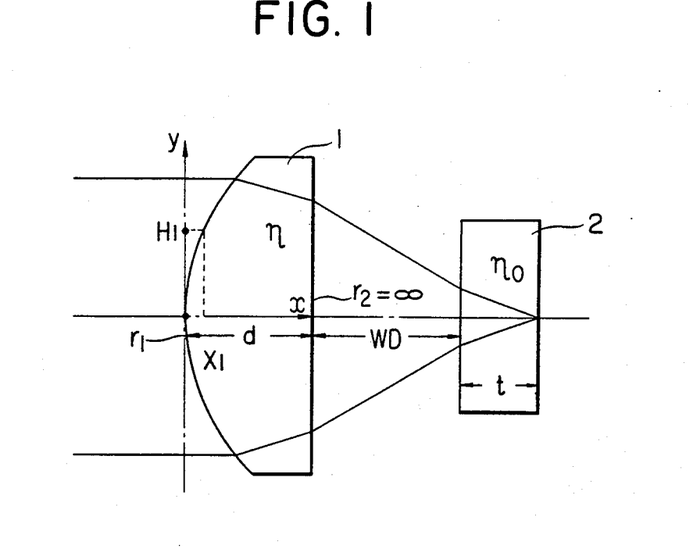
FIGS. 1 and 2 schematically shows the imaging optical systems according to the present invention.
Figure 2:
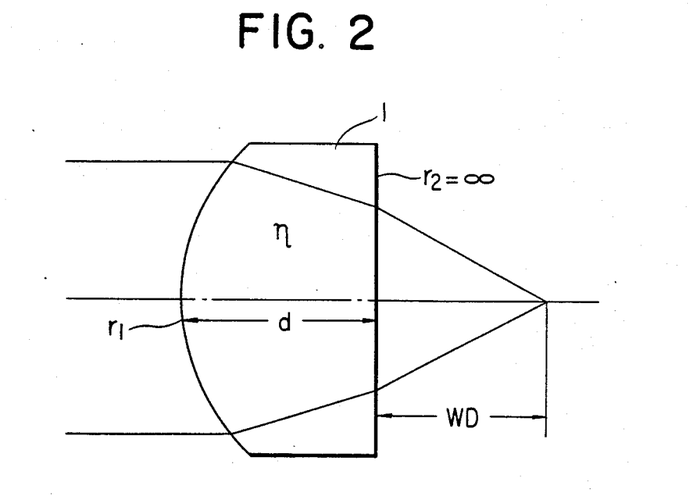

In the embodiments below $r_1$ is the radius of curvature of the first surface of the lens 1 in the vicinity of the optic axis as shown in FIGS. 1 and 2, $r_2$ is the radius of curvature of the second surface, d is the thickness of the lens 1, n is the refractive index of the lens 1 at a wavelength of 830 nm, WD is the working distance, and f is the focal length of the lens 1. $n_0$ is the refractive index of the parallel flat plate 2, and t is the thickness of the parallel flat plate 2. FIG. 1 shows an imaging optical system including a thin parallel flat plate, and FIG. 2 shows an imaging optical system comprising only a non-spherical single lens. In these embodiments, the object distance is set to infinity.

When the vertex of each surface of the lens is the origin and the optic axis is the x-axis and the incidence height is $H_1$, the non-spherical shape is represented by the following equation including terms up to the tenth power of the incidence height $H_1$ with the rotation-symmetrical quadratic surface (represented by the first term of the right side as the base, but the limit of this degree is expediential and is not restrictive. $K_1$ is a cone constant and, when $K_1 = 0$, the base is a spherical base.

$$X_1 = \frac{H_1^2/r_1}{1 + \sqrt{1 - (1 + K_1)(H_1/r_1)^2}} + B_1 \cdot H_1^4 + C_1 \cdot H_1^6 + D_1 \cdot H_1^8 + E_1 \cdot H_1^{10} + A_1' \cdot H_1^3 + B_1' \cdot H_1^5 + C_1' \cdot H_1^7 +$$

Figure 3:
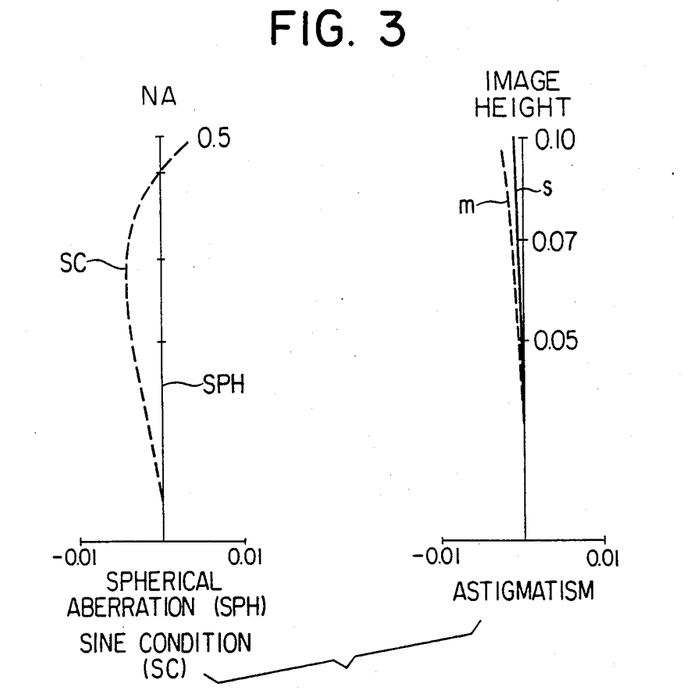
FIGS. 3, 4, 5, 6, 7, 8, 9, 10, 11, 12 and 13 show the various aberrations in various embodiments of the imaging optical system according to the present invention.
Figure 4:
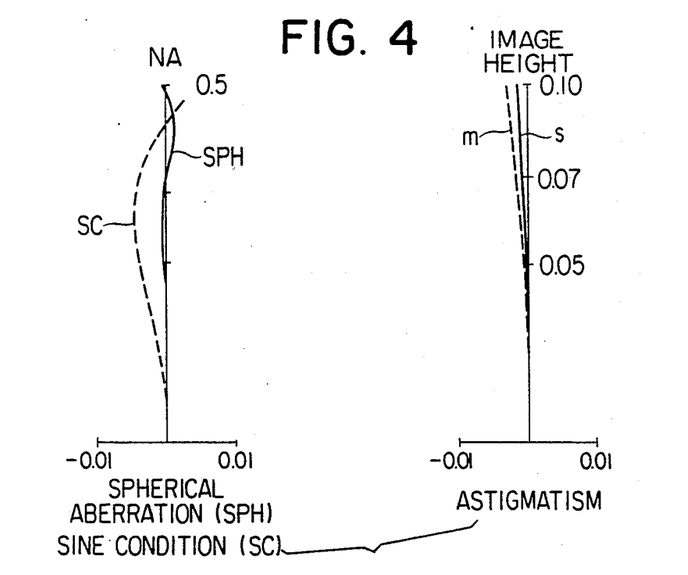
Figure 5:
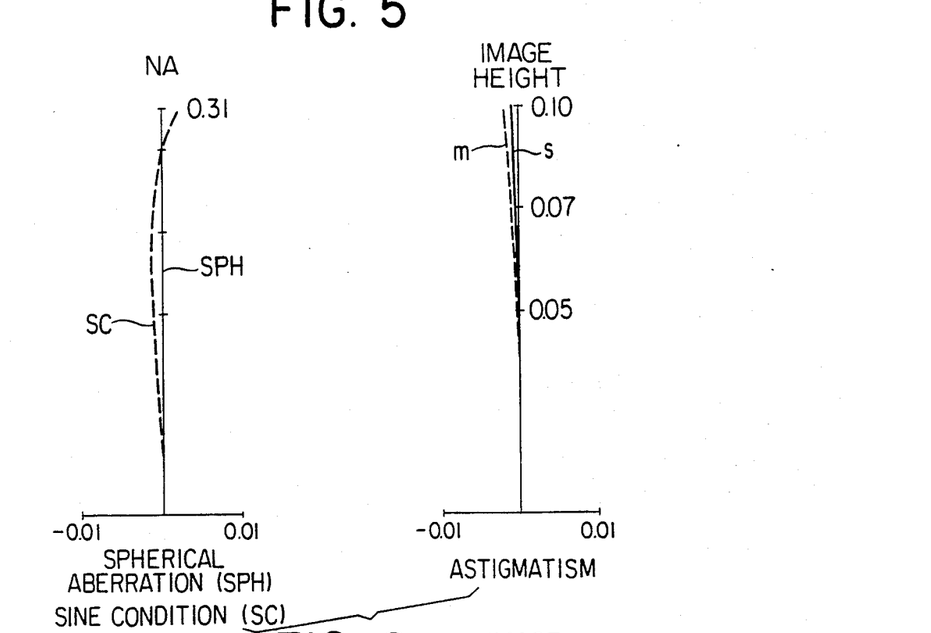
Figure 6:
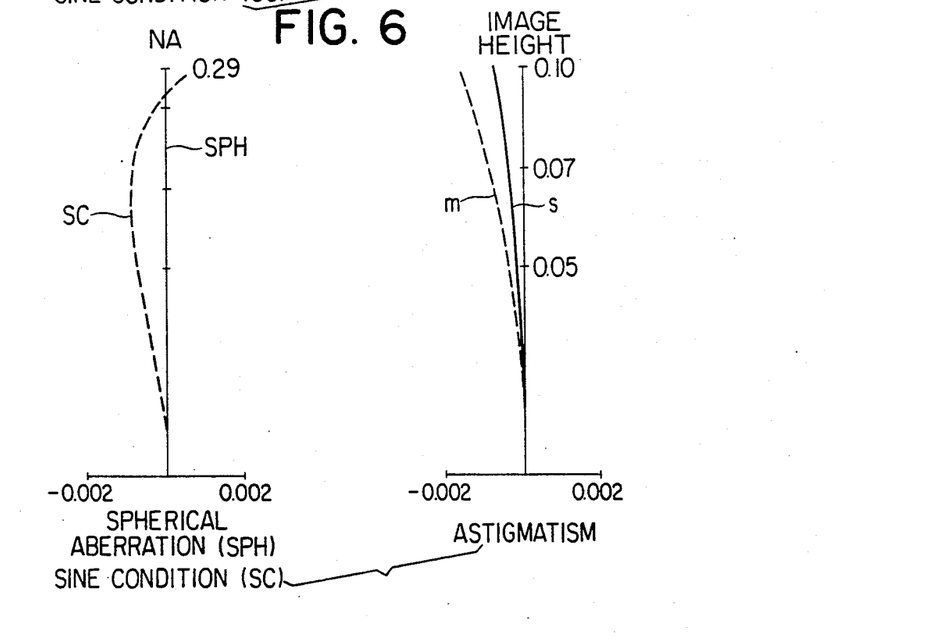
Figure 7:
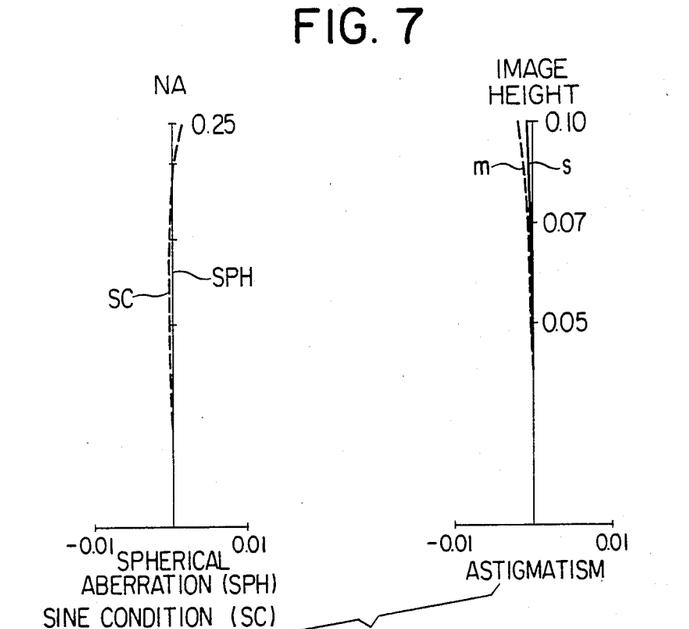
Figure 8:
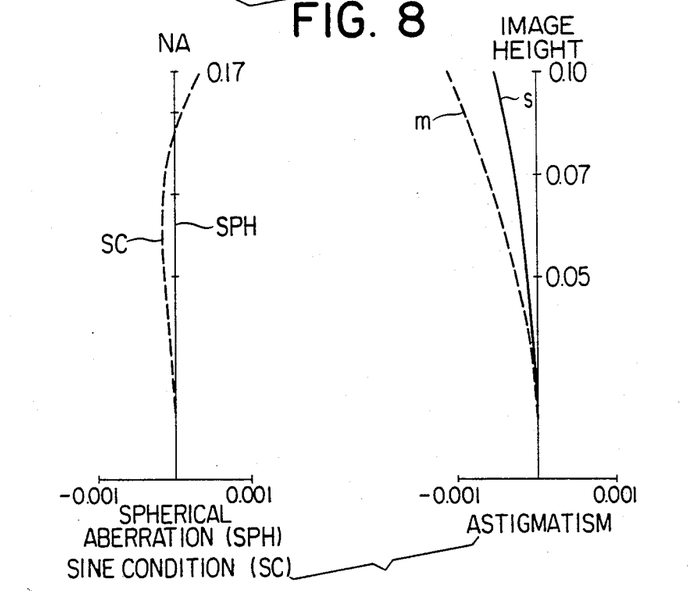
Figure 9:
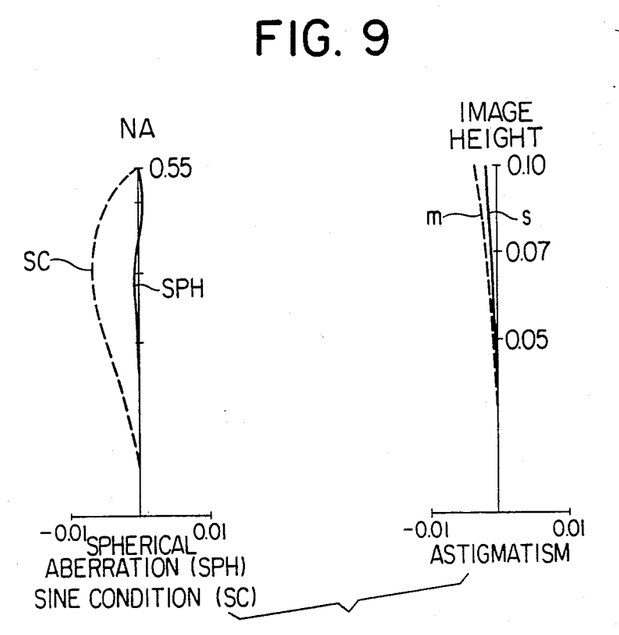
Figure 10:
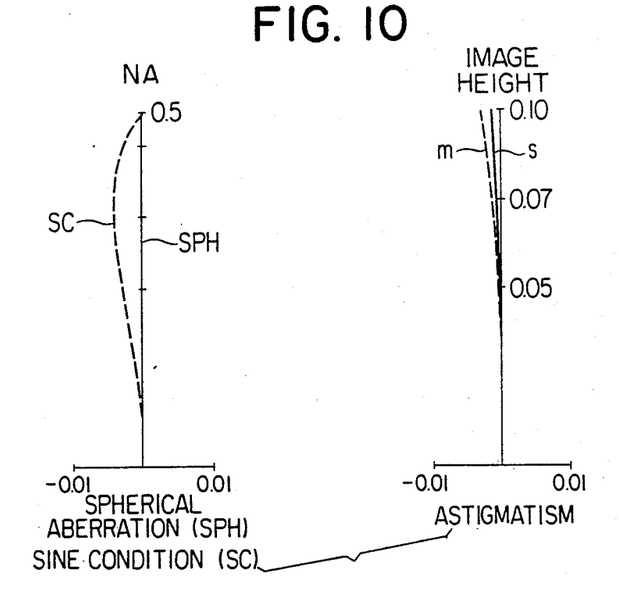
Figure 11:
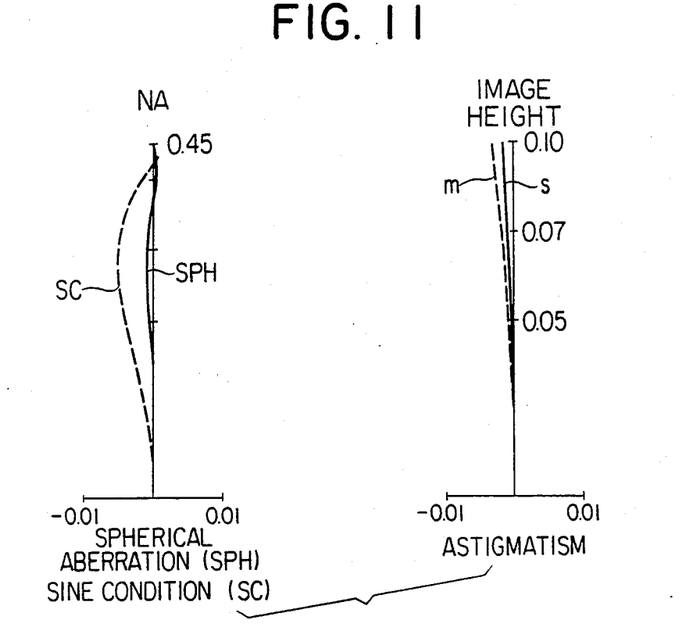
Figure 12:
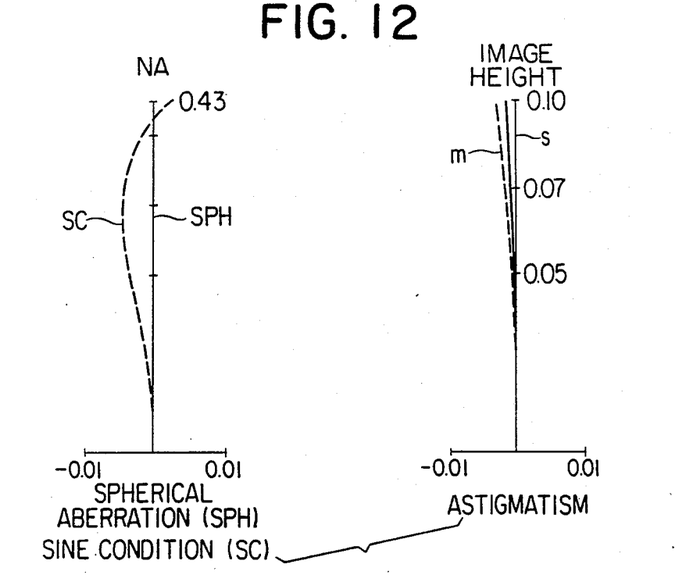
Figure 13:
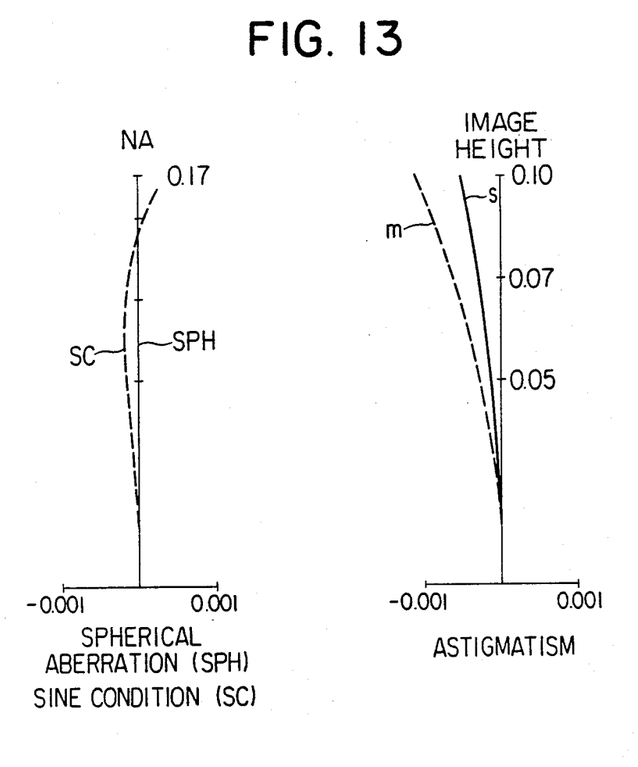

Of Embodiments 1 to 11 shown below, Embodiments 1 to 10 are ones in which, as shown in FIG. 1, the imaging optical system comprises a non-spherical single lens 1 and parallel flat plate 2, and Embodiment 11 is one in which, as shown in FIG. 2, the imaging optical system comprises a non-spherical single lens. FIGS. 3 to 13 show the aberrations in the respective embodiments that is, FIG. 3 shows the aberrations in Embodiment 1, FIG. 4 shows the aberrations in Embodiment 2, FIG. 5 shows the aberrations in Embodiment 3, FIG. 6 shows the aberrations in Embodiment 4, FIG. 7 shows the aberrations in Embodiment 5, FIG. 8 shows the aberrations in Embodiment 6, FIG. 9 shows the aberrations in Embodiment 7, FIG. 10 shows the aberrations in Embodiment 8, FIG. 11 shows the aberrations in Embodiment 9, FIG. 12 shows the aberrations in Embodiment 10, and FIG. 13 shows the aberrations in Embodiment 11. In these aberration graphs, SPH represents spherical aberration, SC represents the sine condition, m represents the meridional image plane, and S represents the sagittal image plane.

$D_1' \cdot H_1^9$

Embodiment 1 (FIG. 3)
$f = 4.35$  WD = 2.39335
$r_1 = 3.22522$  $r_2 = \infty$
$d = 2.0$  $n = 1.74143$
$t = 1.2$  $n_0 = 1.48484$
$K_1 = -1.43945 \times 10^{-1}$  $A_1' = -1.13553 \times 10^{-4}$
$B_1 = -1.23506 \times 10^{-3}$  $B_1' = -1.96024 \times 10^{-4}$
$C_1 = -6.8728 \times 10^{-5}$  $C_1' = -5.44736 \times 10^{-7}$
$D_1 = -4.84449 \times 10^{-6}$  $D_1' = 1.17667 \times 10^{-7}$
$E_1 = -1.15973 \times 10^{-6}$
NA = 0.5
$q = 1.35$ Embodiment 2 (FIG. 4)
$f = 4.35$  WD = 2.39335
$r_1 = 3.22522$  $r_2 = \infty$
$d = 2.0$  $n = 1.74143$
$t = 1.2$  $n_0 = 1.48484$
$K_1 = 0$  $A_1' = 0$
$B_1 = -2.03105 \times 10^{-3}$  $B_1' = 0$
$C_1 = -1.63683 \times 10^{-4}$  $C_1' = 0$
$D_1 = -9.25843 \times 10^{-6}$  $D_1' = 0$
$E_1 = -1.61926 \times 10^{-6}$
NA = 0.5
$q = 1.35$ Embodiment 3 (FIG. 5)
$f = 7.0$  WD = 4.4226
$r_1 = 5.19001$  $r_2 = \infty$
$d = 4.2$  $n = 1.74143$
$t = 0.25$  $n_0 = 1.50974$
$K = 0$  $A_1' = 0$
$B_1 = -5.04254 \times 10^{-4}$  $B_1' = 0$
$C_1 = -1.56112 \times 10^{-5}$  $C_1' = 0$
$D_1 = -3.75745 \times 10^{-7}$  $D_1' = 0$
$E_1 = -1.87314 \times 10^{-8}$
NA = 0.3107
$q = 1.41$ Embodiment 4 (FIG. 6)
$f = 8.6$  WD = 5.4484
$r_1 = 6.3763$  $r_2 = \infty$
$d = 5.2$  $n = 1.74143$
$t = 0.25$  $n_0 = 1.50974$
$K_1 = 0$  $A_1' = 0$
$B_1 = -2.72105 \times 10^{-4}$  $B_1' = 0$
$C_1 = -5.58056 \times 10^{-6}$  $C_1' = 0$
$D_1 = -9.14688 \times 10^{-8}$  $D_1' = 0$
$E_1 = -2.69755 \times 10^{-9}$
NA = 0.2878
$q = 1.43$ Embodiment 5 (FIG. 7)
$f = 8.7$  WD = 5.6058
$r_1 = 6.45044$  $r_2 = \infty$
$d = 5.1$  $n = 1.74143$
$t = 0.25$  $n_0 = 1.50974$
$K_1 = 0$  $A_1' = 0$
$B_1 = -2.64679$  $B_1' = 0$
$C_1 = -5.29356 \times 10^{-6}$  $C_1' = 0$
$D_1 = -8.27118 \times 10^{-8}$  $D_1' = 0$
$E_1 = -2.92641 \times 10^{-9}$
NA = 0.25
$q = 1.42$ Embodiment 6 (FIG. 8)
$f = 13.0$  WD = 8.499
$r_1 = 9.63859$  $r_2 = \infty$
$d = 7.55$  $n = 1.74143$
$t = 0.25$  $n_0 = 1.50974$
$K_1 = 0$  $A_1' = 0$
$B_1 = -7.97634 \times 10^{-5}$  $B_1' = 0$
$C_1 = -7.13419 \times 10^{-7}$  $C_1' = 0$
$D_1 = -5.11056 \times 10^{-9}$  $D_1' = 0$
$E_1 = -9.67598 \times 10^{-11}$
NA = 0.1673
$q = 1.43$ Embodiment 7 (FIG. 9)
$f = 3.995$  WD = 1.5275
$r_1 = 3.24994$  $r_2 = \infty$
$d = 2.95$  $n = 1.82173$
$t = 1.2$  $n_0 = 1.48484$
$K_1 = 0$  $A_1' = 0$
$B_1 = -1.83728 \times 10^{-3}$  $B_1' = 0$
$C_1 = -1.53942 \times 10^{-4}$  $C_1' = 0$
$D_1 = -8.10898 \times 10^{-6}$  $D_1' = 0$
$E_1 = -1.70551 \times 10^{-6}$
NA = 0.55
$q = 1.32$ Embodiment 8 (FIG. 10)
$f = 4.35$  WD = 1.533
$r_1 = 3.76984$  $r_2 = \infty$
$d = 3.75$  $n = 1.8663$
$t = 1.2$  $n_0 = 1.48484$
$K_1 = 0$  $A_1' = 0$
$B_1 = -1.1641 \times 10^{-3}$  $B_1' = 0$
$C_1 = -7.44001 \times 10^{-5}$  $C_1' = 0$
$D_1 = -3.56875 \times 10^{-6}$  $D_1' = 0$
$E_1 = -3.5554 \times 10^{-7}$
$q = 1.31$
NA = 0.5

Embodiment 9 (FIG. 11)
$f = 4.834$  WD = 3.1599
$r_1 = 3.38288$  $r_2 = \infty$
$d = 1.472$  $n = 1.69981$
$t = 1.2$  $n_0 = 1.48484$
$K_1 = 0$  $A_1' = 0$
$B_1 = -1.82181 \times 10^{-3}$  $B_1' = 0$
$C_1 = -1.29763 \times 10^{-4}$  $C_1' = 0$
$D_1 = -6.33561 \times 10^{-6}$  $D_1' = 0$
$E_1 = -1.05688 \times 10^{-6}$
NA = 0.45
$q = 1.29$ Embodiment 10 (FIG. 12)
$f = 5.06$  WD = 3.4761
$r_1 = 3.48513$  $r_2 = \infty$
$d = 1.31$  $n = 1.68876$
$t = 1.2$  $n_0 = 1.48484$
$K_1 = 0$  $A_1' = 0$
$B_1 = -1.68336 \times 10^{-3}$  $B_1' = 0$
$C_1 = -1.12086 \times 10^{-4}$  $C_1' = 0$
$D_1 = -5.34706 \times 10^{-6}$  $D_1' = 0$
$E_1 = -7.63183 \times 10^{-7}$
NA = 0.43
$q = 1.24$ Embodiment 11 (FIG. 13)
$f = 13.0$  WD = 8.521
$r_1 = 9.63859$  $r_2 = \infty$
$d = 7.8$  $n = 1.74143$
$n_0 = 1.50974$
$K_1 = 0$  $A_1' = 0$
$B_1 = -7.97634 \times 10^{-5}$  $B_1' = 0$
$C_1 = -1.12086 \times 10^{-7}$  $C_1' = 0$
$D_1 = -5.11056 \times 10^{-9}$  $D_1' = 0$
$E_1 = -9.67598 \times 10^{-11}$
NA = 0.1673

-continued q = 1.43

We claim:

1. An imaging optical system having a non-spherical single lens having a first surface of a non-spherical shape in which the radius of curvature becomes gradually greater away from the optic axis and a planar second surface, said imaging optical system satisfying the following conditions:

$$1.2 < q < 1.5$$
$$1.68 < n$$
$$q = \frac{d(1 - NA^2)}{f(n - 1)^3}$$

where f is the focal length of said single lens, d is the thickness of said single lens on the optic axis, n is the refractive index of said single lens, NA is the numerical aperture of said single lens and $r_1$ is the radius of curvature of said first surface in the vicinity of the optic axis.

2. An imaging optical system according to claim 1, wherein said numerical aperture NA is about 0.55.

3. An imaging optical system according to claim 1, wherein said first surface of a non-spherical shape is represented by $$x = \frac{H^2/r_1}{1 + \sqrt{1 - (1 + K)(H/r_1)^2}} + B \cdot H^4 + C \cdot H^6 +$$
$$D \cdot H^8 + E \cdot H^{10} + A' \cdot H^3 + B' \cdot H^5 + C' \cdot H^7 + D' \cdot H^9$$

where the axis passing through the vertex of said first surface and perpendicular to the optic axis is the y-axis with respect to H, the optic axis is the x-axis, K is a cone constant, and B, C, D, E, A', B', C, and D' are coefficients representing the degrees of non-sphericity.

4. An imaging optical system having a non-spherical single lens having a first surface of a non-spherical shape in which the radius of curvature becomes gradually greater away from the optic axis and a planar second surface, and a parallel plate of a thickness t disposed adjacent to the second surface of said non-spherical single lens, said imaging optical system satisfying the following conditions:

$$1.2 < q < 1.5$$
$$1.68 < n$$
$$q = \frac{(d + t)(1 - NA^2)}{f(n - 1)^3}$$

where f is the focal length of said single lens, d is the thickness of said single lens, n is the refractive index of said single lens, NA is the numerical aperture of said single lens, and $r_1$ is the radius of curvature of said first surface in the vicinity of the optic axis.

5. An imaging optical system according to claim 4, wherein said numerical aperture NA is about 0.55.

6. An imaging optical system according to claim 4, wherein said first surface of a non-spherical shape is represented by $$x = \frac{H^2/r_1}{1 + \sqrt{1 - (1 + K)(H/r_1)^2}} + B \cdot H^4 + C \cdot H^6 +$$
$$D \cdot H^8 + E \cdot H^{10} + A' \cdot H^3 + B' \cdot H^5 + C \cdot H^7 + D' \cdot H^9,$$

where the axis passing through the vertex of said first surface and perpendicular to the optic axis is the y-axis with respect to H, the optic axis is the x-axis, K is a cone constant, and B, C, D, E, A', B', C' and D' are coefficients representing the degrees of non-sphericity.

* * * * *

UNITED STATES PATENT AND TRADEMARK OFFICE
CERTIFICATE OF CORRECTION

PATENT NO. : 4,657,352

DATED : April 14, 1987

INVENTOR(S) : SHIGEYUKI SUDA, ET AL.

It is certified that error appears in the above-identified patent and that said Letters Patent is hereby corrected as shown below:

COLUMN 1

Line 8, "in" should read --with--.
Line 16, "Pablication" should read --Publication--.
Line 17, "-open" should read -- -Open--.
Line 22, "usage" should read --purpose--.
Lines 30, 32, 33, and 34 "-open" should read -- -Open--.
Line 40, "obtain" should read --attain--.

COLUMN 2

Line 6, "right" should read --light--.
Line 18, "aforemention" should read --aforementioned--.
Line 22, "shows the" should read --show--.
Line 42, "flams," should read --flame,--.
Line 51, "direction" should read --directional--.

COLUMN 3

Line 17, Insert --($K_1$ is a cone constant; $B_1$, $A_1$, etc. are coefficients representing the degrees of non-sphericity of the terms of the respective powers.)--.
Line 24, "such" should be deleted.

COLUMN 4

Lines 4-5, "there-/fore; $r_1$" should read --therefore $r_1$--.
Line 18, "Standing" should read --Based--.
Line 30, "the" should read --there--.
Line 32, "the" should be deleted.
Line 59, "side as" should read --side) as--.

UNITED STATES PATENT AND TRADEMARK OFFICE
CERTIFICATE OF CORRECTION

PATENT NO. : 4,657,352
DATED : April 14, 1987
INVENTOR(S) : SHIGEYUKI SUDA, ET AL.

It is certified that error appears in the above-identified patent and that said Letters Patent is hereby corrected as shown below:

COLUMN 5

Line 10, "embodiments" should read --embodiments,--.

COLUMN 8

Line 1, "C, and" should read --C', and--.

Signed and Sealed this

Thirteenth Day of October, 1987

Attest:

DONALD J. QUIGG

Attesting Officer

Commissioner of Patents and Trademarks